United States Patent
Matsushima et al.

(10) Patent No.: US 7,853,400 B2
(45) Date of Patent: Dec. 14, 2010

(54) CONTROL APPARATUS FOR INTERNAL COMBUSTION ENGINE

(75) Inventors: Yuhei Matsushima, Chiyoda-ku (JP);
Hideki Hagari, Chiyoda-ku (JP);
Keitaro Ezumi, Aki-gun (JP);
Tomokuni Kusunoki, Aki-gun (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/496,189

(22) Filed: Jul. 1, 2009

(65) Prior Publication Data

US 2010/0174472 A1     Jul. 8, 2010

(30) Foreign Application Priority Data

Jan. 6, 2009    (JP) .............................. 2009-000887

(51) Int. Cl.
*F02P 5/15*      (2006.01)
(52) U.S. Cl. .............. 701/111; 123/406.38; 123/406.34; 123/480; 123/435
(58) Field of Classification Search ................ 701/111, 701/106; 123/406.21, 406.29, 406.34, 406.37, 123/406.38, 406.39, 435, 480
See application file for complete search history.

(56) References Cited

U.S. PATENT DOCUMENTS

| | | | |
|---|---|---|---|
| 7,424,820 B2 * | 9/2008 | Iwade et al. | 73/35.01 |
| 7,478,624 B2 * | 1/2009 | Kaneko et al. | 123/406.37 |
| 7,643,932 B2 * | 1/2010 | Iwade et al. | 701/111 |
| 7,681,552 B2 * | 3/2010 | Kaneko et al. | 123/406.29 |

FOREIGN PATENT DOCUMENTS

| | | |
|---|---|---|
| JP | 60-243369 A | 12/1985 |
| JP | 08-004580 A | 1/1996 |
| JP | 2005-188297 A | 7/2005 |
| JP | 2006-169996 A | 6/2006 |
| JP | 2007-009725 A | 1/2007 |
| JP | 2007-092620 A | 4/2007 |
| JP | 2007-255195 A | 10/2007 |
| JP | 2009-250212 | * 10/2009 |

* cited by examiner

*Primary Examiner*—Hai H Huynh
(74) *Attorney, Agent, or Firm*—Sughrue Mion, PLLC; Richard Turner

(57) ABSTRACT

A knock control apparatus includes: a knock sensor for detecting knock of an internal combustion engine; a signal processing section for calculating a knock intensity; and knock determination level setting sections: for calculating an average value of the knock intensity; for calculating, based on the average value, an overall variance of the knock intensity of an entirety of a frequency distribution, a higher variance of the knock intensity above the average value, and a lower variance of the knock intensity below the average value; for calculating a standard deviation of the knock intensity from the overall variance; for presetting a value allowing the frequency distribution of the knock intensity to be a predetermined confidence interval as a confidence coefficient; and for setting a sum of the average value and a value obtained by multiplying the standard deviation by the corrected confidence coefficient as a knock determination level.

12 Claims, 8 Drawing Sheets

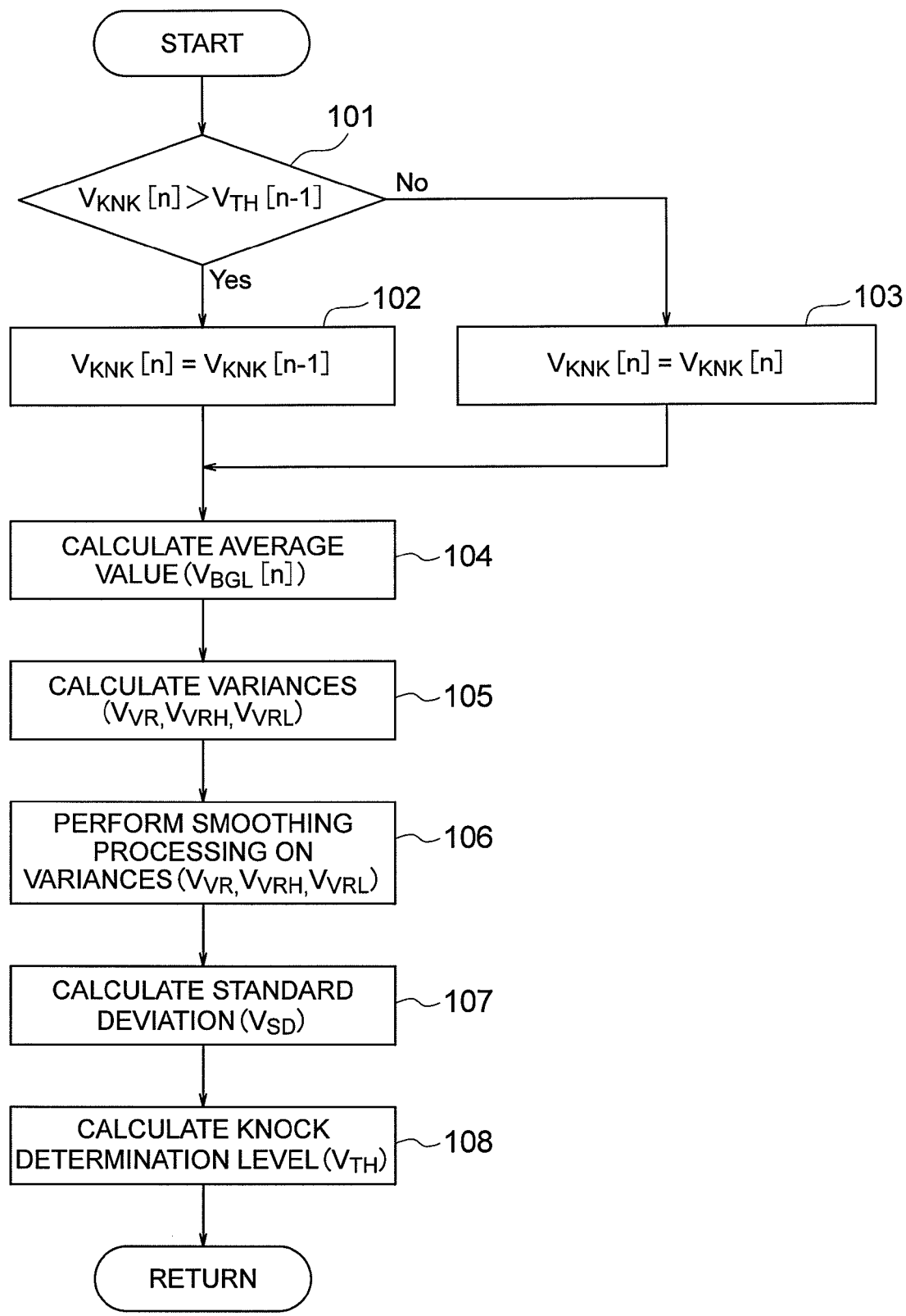

CONTROL APPARATUS FOR INTERNAL COMBUSTION ENGINE

BACKGROUND OF THE INVENTION

1. Field of the Invention

The present invention relates to a knock control apparatus for an internal combustion engine, and more specifically, to a method of setting a knock determination level.

2. Description of the Related Art

In general, a knock control system judges the occurrence of knock when an electric signal from a knock sensor for detecting a vibration of an engine (hereinafter, referred to as a knock sensor signal) exceeds a predetermined level (hereinafter, referred to as a knock determination level) to retard ignition timing. On the other hand, when the knock is not detected for a predetermined period of time, the knock control system advances the ignition timing to constantly control the ignition timing to be in the vicinity of a knock limit. In this manner, the maximum fuel efficiency and output characteristics of the engine are obtained.

In the knock control system as described above, the knock determination level has a great importance. Specifically, when the knock determination level is too high, the knock is not detected even though the knock actually occurs. Therefore, the ignition timing is advanced to cause frequent knocking, which leads to damage to the engine. On the other hand, when the knock determination level is too low, the knock is erroneously detected even though the knock does not actually occur. As a result, the ignition timing is retarded, failing to obtain a sufficiently high output of the engine.

As a method of setting the knock determination level, for example, there is known a method involving multiplying an average value of peak hold values of the knock sensor signals by a gain closely pre-matched for each revolution of the engine and then adding an offset voltage to the result of multiplication to obtain an appropriate knock determination level.

Besides the above-mentioned method, a technology of correcting the knock determination level based on a lognormal distribution obtained by logarithmic transformation of a maximum value of the output signal from the knock sensor to precisely judge the occurrence/non-occurrence of the knock has also been proposed (For example, Japanese Patent Application Laid-open No. 2007-9725).

In the conventionally known methods of setting the knock determination level, however, a considerably large number of steps are required for the gain or offset matching. Moreover, each of the internal combustion engines has a manufacturing error even when the internal combustion engines are of the same type. Therefore, there is a problem in that the knock determination level is set to an inappropriate value to prevent precise knock detection from being performed even though the gain or the offset is closely matched.

Further, in the technology disclosed in Japanese Patent Application Laid-open No. 2007-9725, the knock sensor signal is subjected to statistical processing after being subjected to the logarithmic transformation. Therefore, when the distribution of the knock sensor signal does not become the lognormal distribution, there is a problem that the knock determination level is set to an inappropriate value to prevent precise knock detection from being performed.

SUMMARY OF THE INVENTION

The present invention has been devised to solve the problems described above, and therefore has an object of obtaining a knock control apparatus for an internal combustion engine, which is capable of setting a precise knock determination level without performing close matching regardless of a distribution profile of a knock sensor signal.

A knock control apparatus for an internal combustion engine according to the present invention includes: a knock sensor for detecting knock of an internal combustion engine; a signal processing section for performing frequency analysis using discrete Fourier transform on a knock sensor signal output from the knock sensor for each cylinder and each ignition cycle to calculate a knock intensity; and a knock determination level setting section: for calculating an average value of the knock intensity; for calculating, based on the average value, an overall variance corresponding to a variance of the knock intensity of an entirety of a frequency distribution, a higher variance corresponding to a variance of the knock intensity above the average value, and a lower variance corresponding to a variance of the knock intensity below the average value; for calculating a standard deviation of the knock intensity from the overall variance; for presetting a value allowing the frequency distribution of the knock intensity to be a predetermined confidence interval as a confidence coefficient and correcting the confidence coefficient based on the higher variance and the lower variance to calculate a corrected confidence coefficient; and for setting a sum of the average value and a value obtained by multiplying the standard deviation by the corrected confidence coefficient as a knock determination level.

The knock control apparatus for an internal combustion engine according to the present invention is capable of automatically correcting the knock determination level for various factors such as a manufacturing variation in the internal combustion engine or in the knock sensor and an operating state, which may vary the frequency distribution of the knock intensity. Therefore, the knock control apparatus for an internal combustion engine can set the knock determination level to an appropriate value without close matching. As a result, the knock control apparatus for an internal combustion engine has the effect of enabling the detection of a state where the knock occurs with high accuracy.

BRIEF DESCRIPTION OF THE DRAWINGS

In the accompanying drawings:

FIG. 10 is a flowchart illustrating an operation of a knock determination level setting section in the knock control apparatus for the internal combustion engine according to the first embodiment of the present invention.

DETAILED DESCRIPTION OF THE PREFERRED EMBODIMENT

Hereinafter, a preferred embodiment of a control apparatus for an internal combustion engine according to the present invention is described referring to the accompanying drawings.

First Embodiment

Figure 1:
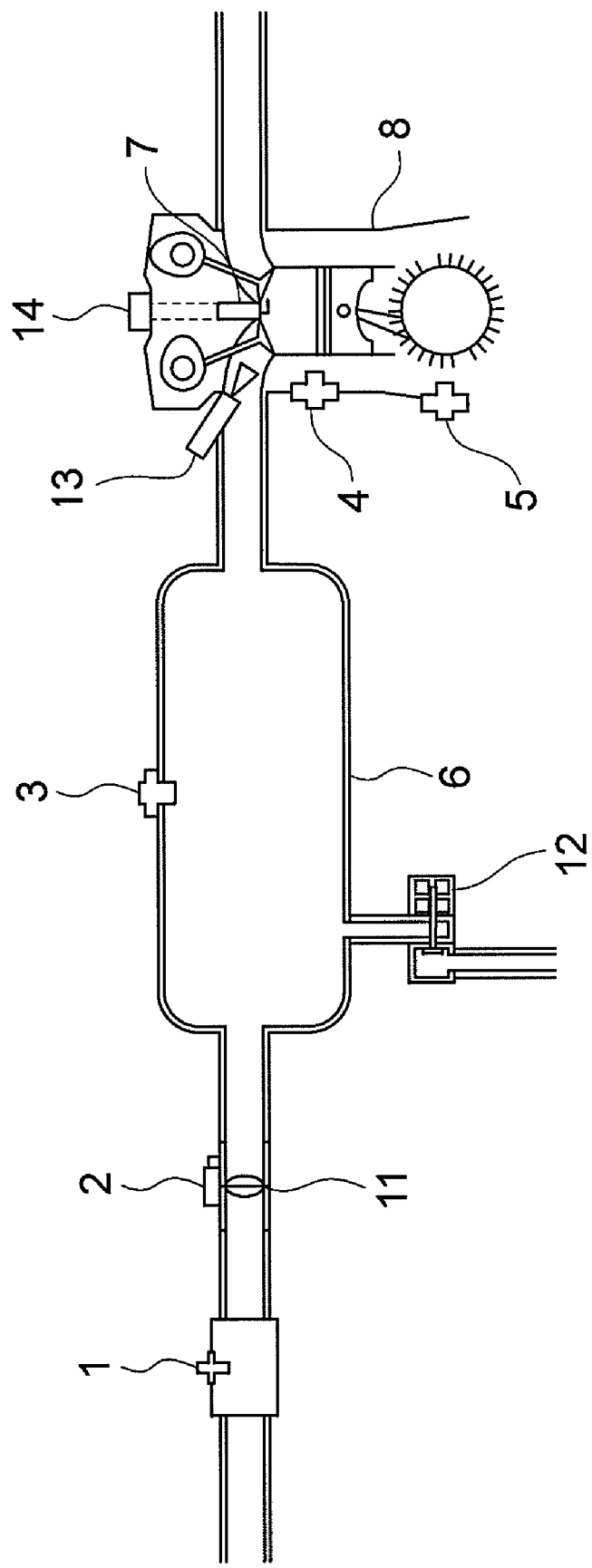
FIG. 1 is a view illustrating a schematic sectional configuration of a periphery of an internal combustion engine according to a first embodiment of the present invention.

A knock control apparatus for an internal combustion engine according to a first embodiment of the present invention is described referring to FIGS. 1 to 10. FIG. 1 is a view illustrating a schematic sectional configuration of a periphery of an internal combustion engine according to the first embodiment of the present invention. In the following description, the same reference numeral denotes the same or equivalent part in each of the drawings.

As illustrated in FIG. 1, an airflow sensor 1, a throttle opening degree sensor 2, an intake manifold pressure sensor 3, a knock sensor 4, and a crank angle sensor 5 are provided. The airflow sensor 1 is provided upstream (on the left) of an intake air passage to measure the amount of intake airflow. The throttle opening degree sensor 2 measures an opening degree of an electronically-controlled throttle valve 11 described below. The intake manifold pressure sensor 3 measures a pressure in a surge tank 6 situated downstream of the electronically-controlled throttle valve 11. The knock sensor 4 detects a vibration (knock) of an internal combustion engine 8. The crank angle sensor 5 detects an edge of a plate provided to a crankshaft to detect a rotation speed or a crank angle of the internal combustion engine 8.

In addition, the electronically-controlled throttle valve 11, an electronically-controlled EGR valve 12, an injector 13, an ignition coil 14, and an ignition plug 7 are provided. The electronically-controlled throttle valve 11 is provided upstream of the intake air passage, and is electronically controlled to adjust an intake airflow amount. The electronically-controlled EGR valve 12 is connected to a bottom surface of the surge tank 6. The injector 13 is provided in the intake air passage at the downstream of the surge tank 6 to inject a fuel. The ignition coil 14 and the ignition plug 7 serve to ignite an air-fuel mixture in a cylinder of the internal combustion engine 8.

The airflow sensor 1 and the intake manifold pressure sensor 3 may be both provided, or only any one of them may be provided. The injector 13 may be provided to directly inject the fuel to the cylinder of the internal combustion engine 8.

Figure 2:
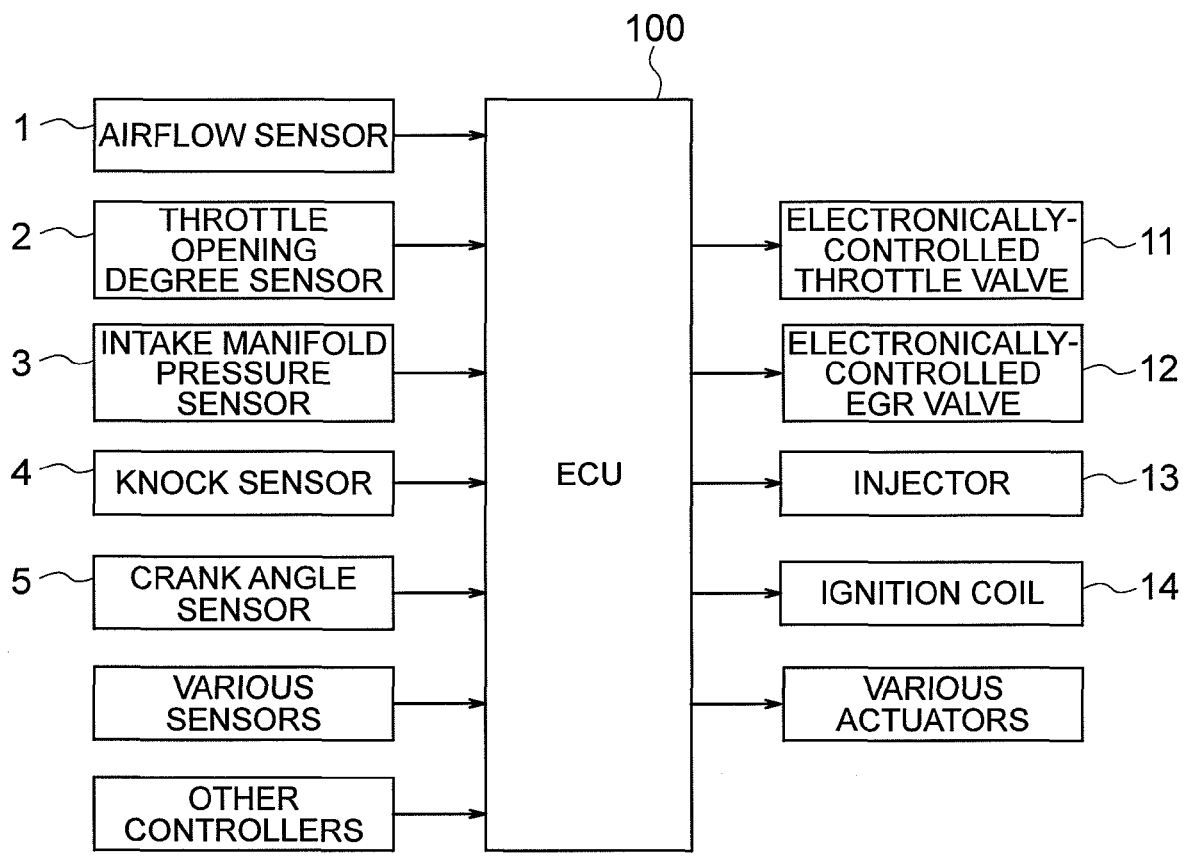
FIG. 2 is a block diagram illustrating a configuration of a control apparatus for the internal combustion engine according to the first embodiment of the present invention.

FIG. 2 is a block diagram illustrating a configuration of a control apparatus for the internal combustion engine according to the first embodiment of the present invention.

In FIG. 2, the intake airflow amount measured by the airflow sensor 1, an opening degree of the electronically-controlled throttle valve 11, which is measured by the throttle opening degree sensor 2, an intake manifold pressure measured by the intake manifold pressure sensor 3, a vibration waveform of the internal combustion engine, which is measured by the knock sensor 4, and a pulse synchronized with the edge of the plate provided to the crankshaft, which is output from the crank angle sensor 5, are input to an electronic control unit (hereinafter, referred to as an ECU) 100. Measured values are also input to the ECU 100 from various sensors other than those described above. Further, a signal from other controllers (for example, control system for automatic transmission control, brake control, traction control, and the like) is also input to the ECU 100.

The ECU 100 calculates a target throttle opening degree based on an opening degree of an accelerator, an operating state of the internal combustion engine, and the like to control the electronically-controlled throttle valve 11. The ECU 100 also controls an opening degree of the electronically-controlled EGR valve 12 according to a current operating state. In this manner, the ECU 100 drives the injector 13 to achieve a target air-fuel ratio, and controls the energization of the ignition coil 14 to achieve target ignition timing.

When the knock is detected by a method described below, the ECU 100 shifts and sets the target ignition timing to the retard side to perform the control for suppressing the occurrence of the knock. Further, the ECU 100 also calculates instruction values to various actuators other than those described above.

Figure 3:
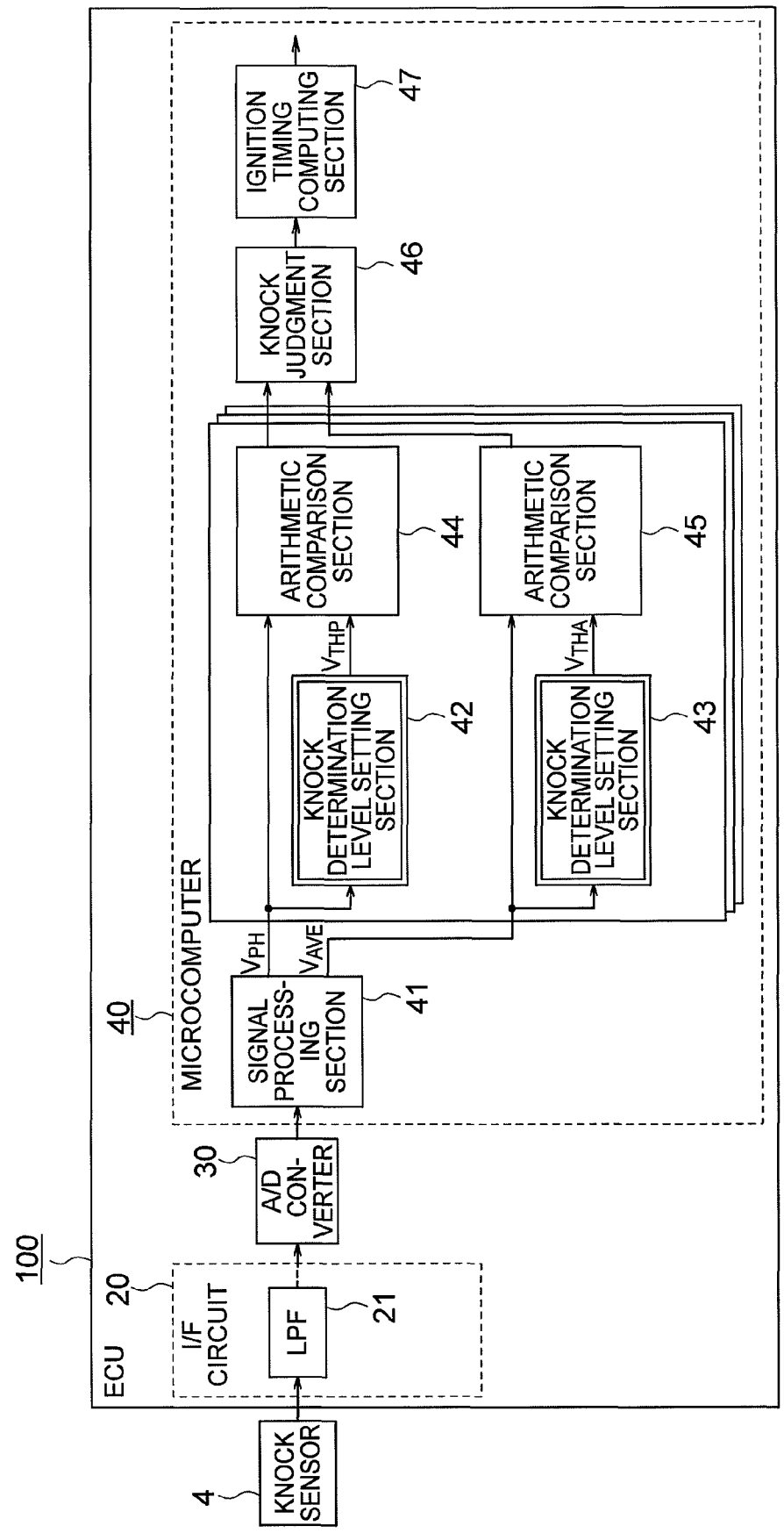
FIG. 3 is a block diagram illustrating an internal configuration of an electronic control unit according to the first embodiment of the present invention.

FIG. 3 is a block diagram illustrating an internal configuration of the ECU according to the first embodiment of the present invention.

In FIG. 3, the ECU 100 includes various I/F circuits 20, an A/D converter 30 for converting an analog signal to a digital signal, and a microcomputer 40.

The I/F circuit 20 for knock control is a lowpass filter (LPF) 21 for removing a high-frequency component of a signal output from the knock sensor.

The microcomputer 40 includes a ROM area for storing various programs and various constants of a confidence coefficient map and a RAM area for storing variables at the time of execution of the program.

In the ROM area of the microcomputer 40, a signal processing section 41, knock determination level setting sections 42 and 43 respectively for different frequencies, arithmetic comparison sections 44 and 45, each being for each of the different frequencies, a knock judgment section 46, and an ignition timing computing section 47 are stored as a program.

Next, an operation of the knock control apparatus for the internal combustion engine according to the first embodiment is described referring to the drawings.

The A/D converter 30 performs A/D conversion on the knock sensor signal at predetermined time intervals (for example, every 10 μs or 20 μs). The A/D converter 30 may constantly perform the A/D conversion or may perform the A/D conversion only during a period in which the knock occurs (for example, from a top dead center (TDC) to an after top dead center (ATDC) 50° CA (crank angle); hereinafter, the period is referred to as a knock detection window).

The signal processing section 41 performs frequency analysis using discrete Fourier transform (DFT) on the knock sensor signal, which has been subjected to the A/D conversion, for each cylinder and each ignition cycle. Then, the signal processing section 41 calculates spectra of a plurality of different frequency components specific to knock to then calculate values correlated with a knock intensity $V_{KNK}$, specifically, a peak hold value $V_{PH}$ and an average value $V_{AVE}$ of each of the spectra.

Figure 4:
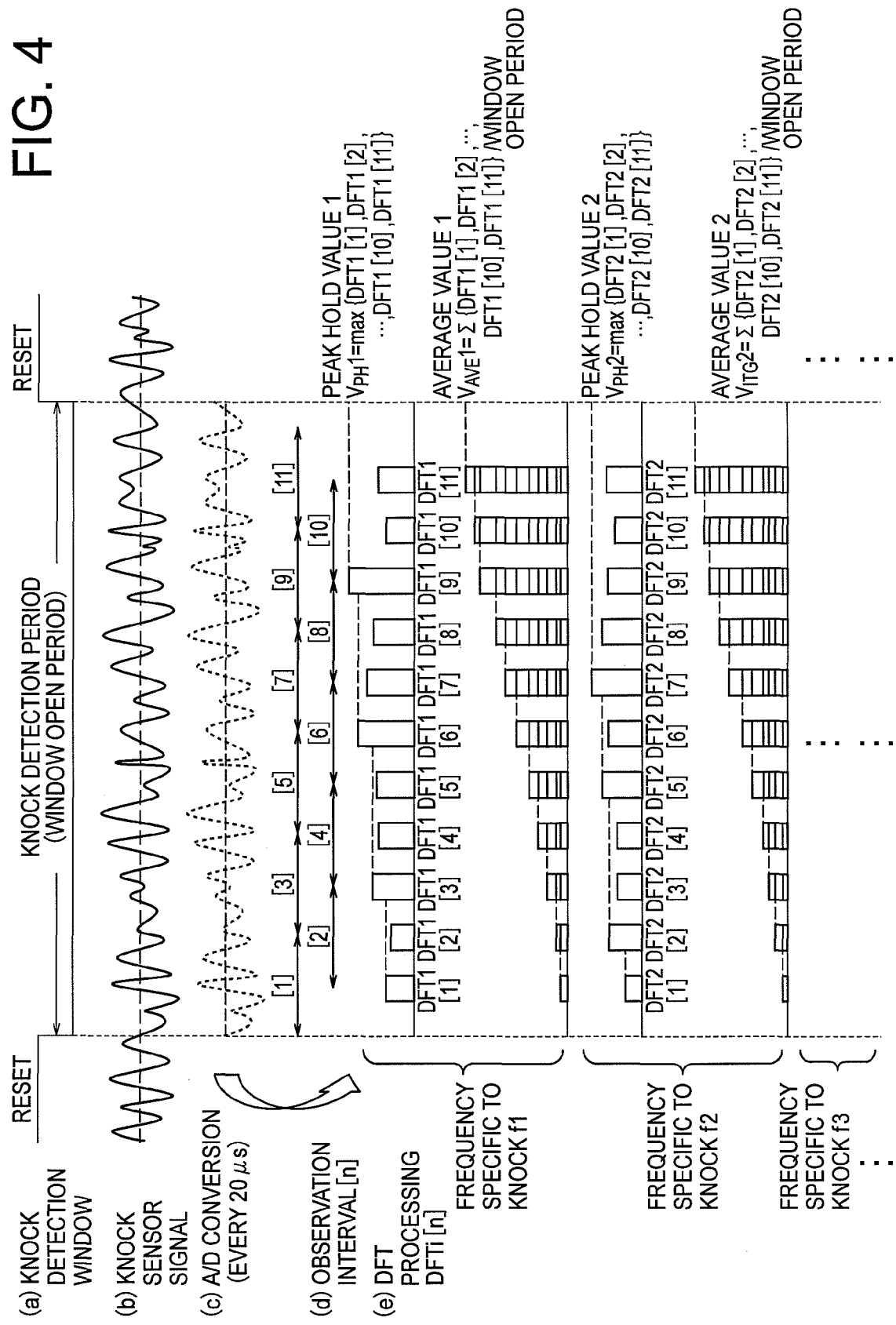
FIG. 4 is a timing chart illustrating operations of an A/D converter and a signal processing section in a knock control apparatus for the internal combustion engine according to the first embodiment of the present invention.

The calculation of the peak hold value $V_{PH}$ and the average value $V_{AVE}$ of the spectrum by the signal processing section 41 is described referring to FIG. 4. FIG. 4 is a timing chart illustrating operations of the A/D converter and the signal processing section in the knock control apparatus for the internal combustion engine according to the first embodiment of the present invention.

FIG. 4 illustrates a knock detection window (a), a knock sensor signal (b), an A/D conversion (c), observation intervals (d), and a DFT processing (e).

Specifically, (c) represents the processing of the A/D conversion performed every 20 μs on the knock sensor signal in the period in which the knock detection window is open (hereinafter, referred to as a knock detection window open period).

Next, for the knock sensor signal loaded by the processing (c), (e) represents processing of dividing the knock sensor signal into observation intervals and calculating the spectra of the plurality of frequency components specific to knock for each observation interval by the DFT processing. Specifically, the signal processing section 41 calculates a maximum value of the spectrum in the knock detection window open period as the peak hold value $V_{PH}$, and divides an integrated value of the spectrum in the knock detection window open period by the knock detection window open period to calculate the average value $V_{AVE}$.

In processing (d) of FIG. 4, the adjacent observation intervals are shifted in a time direction to overlap by half. Such an arrangement of the observation intervals is adopted to improve time accuracy because the simple division of the entire observation period (for example, when only the odd-numbered observation intervals [1], [3], [5], and the like are used) degrades accuracy in the time direction. In this embodiment, the adjacent observation intervals are overlapped by half. However, according to the frequency to be analyzed, the adjacent observation intervals may be overlapped, for example, by two-thirds.

By using the peak hold value $V_{PH}$ and the average value $V_{AVE}$ calculated by the signal processing section 41, the knock determination level setting sections 42 and 43 set knock determination levels $V_{THP}$ and $V_{THA}$ for the respective frequencies specific to knock. The detailed operation of the knock determination level setting sections 42 and 43 is described below.

The arithmetic comparison section 44 performs computation to determine whether or not the peak hold value $V_{PH}$ is larger than the knock determination level $V_{THP}$. The arithmetic comparison section 45 performs computation to determine whether or not the average value $V_{AVE}$ is larger than the knock determination level $V_{THA}$.

The knock judgment section 46 judges whether or not the knock occurs and the knock intensity based on the results of computation by the arithmetic comparison sections 44 and 45 for the respective frequencies specific to knock. Here, one of the frequencies specific to knock is considered. When the peak hold value $V_{PH}$ is larger than the knock determination level $V_{THP}$, the knock judgment section 46 sometimes judges that the knock occurs in the internal combustion engine 8. When the average value $V_{AVE}$ is larger than the knock determination level $V_{THA}$, the knock judgment section 46 sometimes judges that the knock occurs in the internal combustion engine 8. Further, the knock judgment section 46 sometimes obtains a logical sum of the peak hold value $V_{PH}$ and the average value $V_{AVE}$ for the judgment of the occurrence of the knock. When the peak hold value $V_{PH}$ is larger than the knock determination level $V_{THP}$ or when the average value $V_{AVE}$ is larger than the knock determination level $V_{THA}$, the knock judgment section 46 judges that the knock occurs in the internal combustion engine 8. Further, the knock judgment section 46 sometimes obtains a logical product of the peak hold value $V_{PH}$ and the average value $V_{AVE}$ for the judgment of the occurrence of the knock. When the peak hold value $V_{PH}$ is larger than the knock determination level $V_{THP}$ or when the average value $V_{AVE}$ is larger than the knock determination level $V_{THA}$, the knock judgment section 46 judges that the knock occurs in the internal combustion engine 8.

For a specific one of the plurality of frequencies specific to knock, the knock judgment section 46 sometimes judges that the knock occurs in the internal combustion engine 8 when the peak hold value $V_{PH}$ is larger than the knock determination level $V_{THP}$. The knock judgment section 46 sometimes judges that the knock occurs in the internal combustion engine 8 when the average value $V_{AVE}$ is larger than the knock determination level $V_{THA}$. The subsequent judgment is the same as that described above for the case where one of the frequencies specific to knock is considered.

For the plurality of frequencies specific to knock, the knock judgment section 46 sometimes obtains a logical sum or a logical product of the results of judgment for the respective frequencies to judge that the knock occurs in the internal combustion engine 8.

On the other hand, when the peak hold value $V_{PH}$ is equal to or smaller than the knock determination level $V_{THP}$ or when the average value $V_{AVE}$ is equal to or smaller than the knock determination level $V_{THA}$, the knock judgment section 46 judges that the knock does not occur in the internal combustion engine 8.

The ignition timing computing section 47 adjusts the ignition timing according to the occurrence of knock. When the knock judgment section 46 judges that the knock occurs in the internal combustion engine 8, the ignition timing computing section 47 retards the ignition timing. When the knock judgment section 46 judges that the knock does not occur in the internal combustion engine 8, the ignition timing computing section 47 advances the ignition timing.

Figure 5:
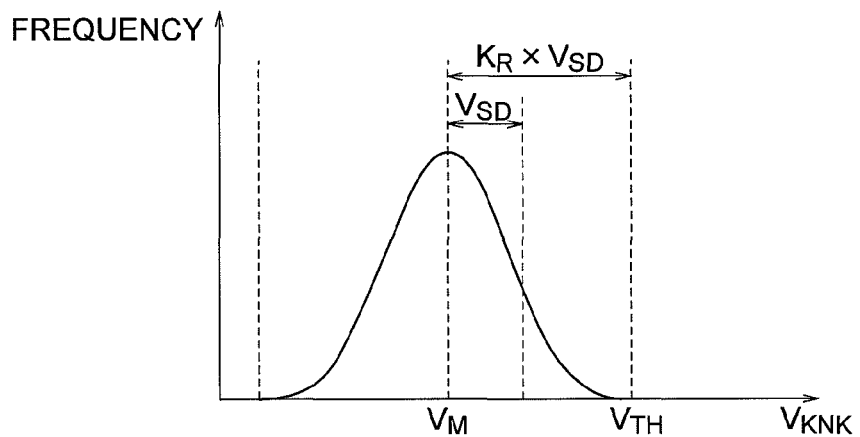
FIG. 5 is a frequency distribution chart of a knock intensity, which follows a normal distribution when knock does not occur.
Figure 6:
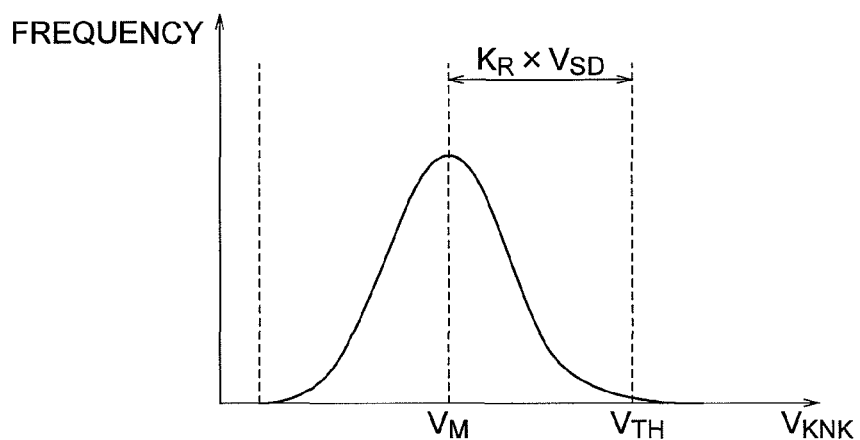
FIG. 6 is a frequency distribution chart of the knock intensity, which follows the normal distribution when the knock occurs.
Figure 7:
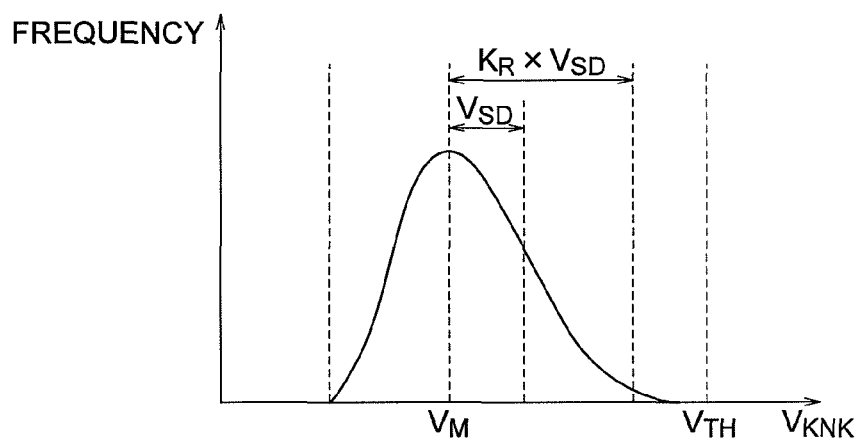
FIG. 7 is a frequency distribution chart of the actual knock intensity when the knock does not occur.
Figure 8:
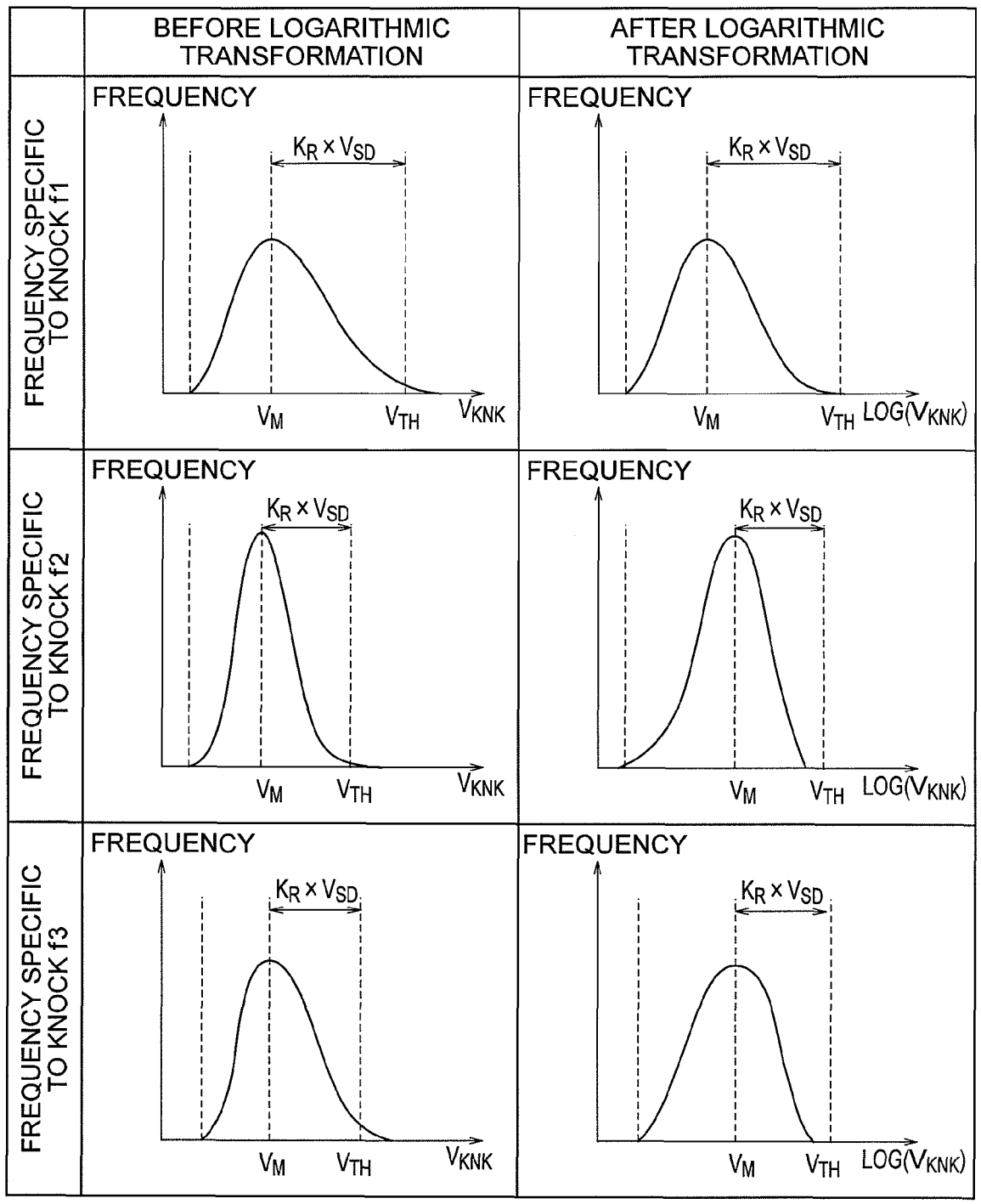
FIG. 8 is a frequency distribution chart of the knock intensity before and after logarithmic transformation processing.
Figure 9:
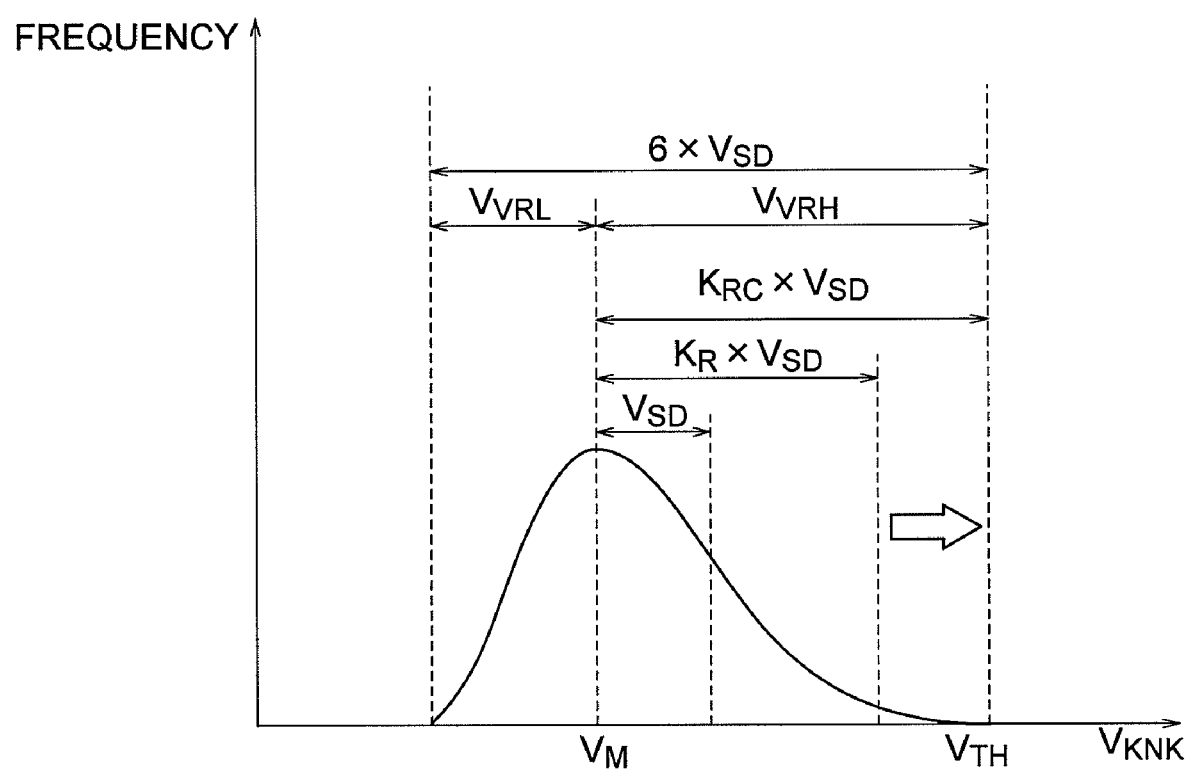
FIG. 9 is a frequency distribution chart of the knock intensity for the knock control apparatus for the internal combustion engine according to the first embodiment of the present invention.

Next, the operations of the knock determination level setting sections 42 and 43 are described in detail. FIG. 5 is a frequency distribution chart of the knock intensity, which follows a normal distribution when the knock does not occur. FIG. 6 is a frequency distribution chart of the knock intensity, which follows the normal distribution when the knock occurs. FIG. 7 is a frequency distribution chart of the actual knock intensity when the knock does not occur. FIG. 8 is a frequency distribution chart of the knock intensity before and after logarithmic transformation processing. FIG. 9 is a frequency distribution chart of the knock intensity for the knock control apparatus for the internal combustion engine according to the first embodiment of the present invention.

First, a method of performing statistical processing on the frequency distribution of the knock intensity $V_{KNK}$ (the peak hold value $V_{PH}$ or the average value $V_{AVE}$ in this embodiment) to set the knock determination level is described referring to FIG. 5.

When the frequency distribution of the knock intensity follows the normal distribution as illustrated in FIG. 5, a knock determination level $V_{TH}$ can be calculated from a standard deviation $V_{SD}$ and a median $V_M$ of the distribution based on the following Formula (1).

$$V_{TH} = V_M + K_R \times V_{SD} \tag{1}$$

where $K_R$ is a confidence coefficient for determining a confidence interval of data. It is known that, when the distribution follows the normal distribution, the confidence interval of 99.7% is obtained with the setting of $K_R=3$. The confidence coefficient $K_R$ is experimentally preset to allow a probability of erroneous detection of a state where the knock does not occur as a state where the knock occurs, to be a predetermined value. The confidence coefficient is set based on the probability of the erroneous judgment of the state where the knock does not occur as the state where the knock occurs from data or knowledge obtained in advance by experiments or the like. As a result, the data for no occurrence of the knock can be set to be distributed within an arbitrary confidence interval. Therefore, the knock determination level can be set to an appropriate value to enable the detection of the state where the knock occurs with high accuracy.

The confidence coefficient $K_R$ is preset on a map using a parameter correlated with an engine revolution or an engine load as an axis. Specifically, a two-dimensional confidence coefficient map is created by setting the parameter correlated with the engine revolution or the engine load on a first axis (for example, an X-axis) and the confidence coefficient $K_R$ on a second axis (for example, a Y-axis) to be stored in the ROM area of the microcomputer 40. Alternatively, a three-dimensional confidence coefficient map is created by plotting the parameter correlated with any one of the engine revolution and the engine load on the first axis (for example, the X-axis), the parameter correlated with the other one of the engine revolution and the engine load on the second axis (for example, the Y-axis), and the confidence coefficient $K_R$ on a third axis (for example, a Z-axis) to be stored in the ROM area of the microcomputer 40. The setting of the confidence coefficient $K_R$ on the map allows the confidence coefficient $K_R$ to be appropriately set even when the knock intensity has a different distribution profile depending on the operating state. Thus, the knock determination level can be set to an appropriate value to enable the detection of the state where the knock occurs with high accuracy.

When the knock intensity $V_{KNK}$ is larger than the knock determination level $V_{TH}$ as illustrated in FIG. 6, it is judged that the knock occurs. Therefore, the knock intensity $V_{KNK}$ in this case is not used for the calculation of the knock determination level.

In practice, however, the distribution of the knock intensity $V_{KNK}$ rarely becomes the normal distribution, and has a distribution profile with the distorted right side as illustrated in FIG. 7 in many cases. Therefore, with the method of setting the knock determination level with the distribution of the knock intensity $V_{KNK}$ being regarded as the normal distribution, the knock intensity $V_{KNK}$ becomes larger than the knock determination level $V_{TH}$ even though the knock does not occur. As a result, the occurrence of the knock is erroneously detected.

In order to remove the distortion of the distribution as illustrated in FIG. 7, the following method is also known. In this method, the logarithmic transformation is performed on the knock intensity $V_{KNK}$ to obtain a lognormal distribution as the distribution profile. Thereafter, the knock determination level is calculated by the statistical processing.

However, the distribution of the knock intensity $V_{KNK}$ has various profiles depending on the frequency specific to knock or the operating state, as illustrated in FIG. 8. Thus, there is a fear that the logarithmic transformation may produce the distribution profile with the distorted left side. As a result, a set value of the knock determination level becomes too large, and hence the knock intensity $V_{KNK}$ becomes smaller than the knock determination level $V_{TH}$ even though the knock occurs. Consequently, the knock cannot be detected.

Therefore, in this embodiment, the confidence coefficient $K_R$ described above is corrected based on the distortion of the frequency distribution of the knock intensity $V_{KNK}$ to set the knock determination level to an appropriate value.

In this embodiment, as an index representing the distortion of the knock intensity $V_{KNK}$, a variance $V_{VRH}$ of the data above (on the right of) the median $V_M$ (hereinafter, referred to as a higher variance $V_{VRH}$) and a variance $V_{VRL}$ of the data below (on the left of) the median $V_M$ (hereinafter, referred to as a lower variance $V_{VRL}$) are used as illustrated in FIG. 9. Alternatively, a standard deviation $V_{SDH}$ of the data above (on the right of) the median $V_M$ (hereinafter, referred to as a higher standard deviation $V_{SDH}$) and a standard deviation $V_{SDL}$ of the data below (on the left of) the median $V_M$ (hereinafter, referred to as a lower standard deviation $V_{SDL}$) are used. The confidence coefficient $K_R$ is corrected based on the above-mentioned values to calculate a corrected confidence coefficient $K_{RC}$.

Specifically, when the higher variance $V_{VRH}$ and the lower variance $V_{VRL}$ are used, the corrected confidence coefficient $K_{RC}$ can be calculated based on the following Formula (2) from the relation: $K_{RC}$: $2 \times K_R = V_{VRH}$: $(V_{VRL} + V_{VRH})$.

$$K_{RC} = 2 \times K_R \times \{V_{VRH}/(V_{VRL} + V_{VRH})\} \qquad (2)$$

Similarly, when the higher standard deviation $V_{SDH}$ and the lower standard deviation $V_{SDL}$ are used, the corrected confidence coefficient $K_{RC}$ can be calculated based on the following Formula (3).

$$K_{RC} = 2 \times K_R \times \{V_{SDH}/(V_{SDL} + V_{SDH})\} \qquad (3)$$

As a result, the confidence coefficient $K_R$ is constantly corrected according to the distortion of the distribution. Therefore, the knock determination level $V_{TH}$ can be set to an appropriate value without being affected by the distortion of the frequency distribution of the knock intensity $V_{KNK}$ due to a manufacturing variation of the internal combustion engine 8 or in the knock sensor 4 or the like and, in addition, without requiring close matching.

Subsequently, the operation of each of the knock determination level setting sections 42 and 43 is described referring to a flowchart. FIG. 10 is a flowchart illustrating the operations of the knock determination level setting sections of the knock control apparatus for the internal combustion engine according to the first embodiment of the present invention. The knock determination level setting sections 42 and 43 respectively set the knock determination levels $V_{TH}$ ($V_{THP}$ and $V_{THA}$) for each ignition cycle.

First, in Step 101, each of the knock determination level setting sections 42 and 43 judges whether or not the knock intensity $V_{KNK}$ (peak hold value $V_{PH}$ or average value $V_{AVE}$) [n] is larger than the previous value $V_{TH}$[n−1] of the knock determination level. When the knock intensity $V_{KNK}$[n] is larger than the previous value $V_{TH}$[n−1] of the knock determination level (Yes in Step 101), each of the knock determination level setting sections 42 and 43 judges that the knock occurs and the process proceeds to Step 102. On the other hand, when the knock intensity $V_{KNK}$[n] is equal to or smaller than the previous value $V_{TH}$[n−1] (No in Step 101), the process proceeds to Step 103.

Next, in Step 102, each of the knock determination level setting sections 42 and 43 sets the previous value $V_{KNK}$[n−1] of the knock intensity as the current value $V_{KNK}$[n] of the knock intensity. For the subsequent computation of the knock determination level, the knock intensity $V_{KNK}$[n] with which the occurrence of the knock is judged is not used. Then, the process proceeds to Step 104.

In Step 103, each of the knock determination level setting sections 42 and 43 uses the knock intensity $V_{KNK}$[n] for the subsequent computation of the knock determination level.

Next, in Step 104, each of the knock determination level setting sections 42 and 43 calculates an average value $V_{BGL}$[n] of the knock intensity $V_{KNK}$[n] based on the following Formula (4).

$$V_{BGL}[n] = K_{BGL} \times V_{BGL}[n-1] + (1-K_{BGL}) \times V_{KNK}[n] \quad (4)$$

where $K_{BGL}$ is a filter coefficient, and a value pre-matched for each engine revolution is used as $K_{BGL}$. For the calculation of the average value, values other than the primary filtered value described above may be used. For example, a moving average value may be used.

In order to obtain the median $V_M$ of the frequency distribution, it is necessary to temporarily store the data, which is sufficient in number to allow the distribution profile to be identified, in the RAM area. Therefore, an extremely large RAM area is required. In this embodiment, the average value $V_{BGL}$ obtained by smoothing processing through the primary filter is used in place of the median $V_M$.

In Steps 101 and 102, when the occurrence of the knock is judged, the above-mentioned filter coefficient $K_{BGL}$ may be adjusted to reduce the effects of the knock intensity $V_{KNK}[n]$ with which the occurrence of the knock is judged, instead of using the previous value $V_{KNK}[n-1]$ of the knock intensity as the knock intensity $V_{KNK}[n]$.

Next, in Step 105, each of the knock determination level setting sections 42 and 43 calculates a variance $V_{VR}[n]$ of the overall distribution of the knock intensity $V_{KNK}[n]$, a variance $V_{VRH}[n]$ of the knock intensity $V_{KNK}[n]$ above the average value $V_{BGL}[n]$, and a variance $V_{VRL}[n]$ of the knock intensity $V_{KNK}[n]$ below the average value $V_{BGL}[n]$ based on the following formulae (5), (6) and (7).

$$V_{VR}[n] = (V_{KNK}[n] - V_{BGL}[n])^2 \quad (5)$$

$$V_{VRH}[n] = (V_{KNK}[n] - V_{BGL}[n])^2 \text{ (because } V_{KNK}[n] \geq V_{BGL}[n]) \quad (6)$$
$$= V_{VRH}[n-1] \text{ (because } V_{KNK}[n] < V_{BGL}[n])$$

$$V_{VRL}[n] = (V_{KNK}[n] - V_{BGL}[n])^2 \text{ (because } V_{KNK}[n] \leq V_{BGL}[n]) \quad (7)$$
$$= V_{VRL}[n-1] \text{ (because } V_{KNK}[n] > V_{BGL}[n])$$

When the standard deviations are used in place of the variances for the calculation of the corrected confidence coefficient $K_{RC}$ in Step 105, each of the knock determination level setting sections 42 and 43 calculates a higher standard deviation $V_{SDH}[n]$ and a lower standard deviation $V_{SDL}[n]$ based on the following Formulae (6)' and (7)'.

$$V_{SDH}[n] = (V_{VRH}[n])^{1/2} \quad (6)'$$

$$V_{SDL}[n] = (V_{VRL}[n])^{1/2} \quad (7)'$$

Next, in Step 106, each of the knock determination level setting sections 42 and 43 performs the smoothing processing on each of the variances obtained in Step 105 based on the following Formulae (8), (9) and (10). The smoothing processing eliminates the needs of storing a large amount of data in the memory or the like to identify the distribution profile of the knock intensity above or below the average value, and hence a memory area can be reduced.

$$VF_{VR}[n] = K_{VR} \times VF_{VR}[n-1] + (1-K_{VR}) \times V_{VR}[n-1] \quad (8)$$

$$VF_{VRH}[n] = K_{VRH} \times VF_{VRH}[n-1] + (1-K_{VRH}) \times V_{VRH}[n-1] \quad (9)$$

$$VF_{VRL}[n] = K_{VRL} \times VF_{VRL}[n-1] + (1-K_{VRL}) \times V_{VRL}[n-1] \quad (10)$$

where $K_{VR}$, $K_{VRH}$, and $K_{VRL}$ are filter coefficients, and a value pre-matched for each engine revolution is used as $K_{VR}$, $K_{VRH}$, and $K_{VRL}$.

When the standard deviations are used in place of the variances for the calculation of the corrected confidence coefficient $K_{RC}$ in Step 106, each of the knock determination level setting sections 42 and 43 performs the smoothing processing on the higher standard deviation $V_{SDH}[n]$ and the lower standard deviation $V_{SDL}[n]$ as expressed by the Formulae (9) and (10) described above to calculate a higher standard deviation $VF_{SDH}[n]$ and a lower standard deviation $VF_{SDL}[n]$.

Next, in Step 107, each of the knock determination level setting sections 42 and 43 calculates the standard deviation $V_{SD}[n]$ of the knock intensity $V_{KNK}[n]$ based on the following Formula (11).

$$V_{SD}[n] = (VF_{VR}[n])^{1/2} \quad (11)$$

In this case, the variance $VF_{VRL}[n]$ may be used in place of the variance $VF_{VR}[n]$.

Then, in Step 108, each of the knock determination level setting sections 42 and 43 calculates the corrected confidence coefficient $K_{RC}$ and the knock determination level $V_{TH}[n]$ based on the following Formulae (12) and (13) from the currently obtained results of calculation.

$$K_{RC} = 2 \times K_R \times VF_{VRH}[n] / (VF_{VRL}[n] + VF_{VRH}[n]) \quad (12)$$

$$V_{TH}[n] = V_{BGL}[n] + K_{RC} \times V_{SD}[n] \quad (13)$$

where $K_R$ is the confidence coefficient, and is pre-matched based on the engine revolution or the engine load as described above.

At this time, a minimum value of the corrected confidence coefficient $K_{RC}$ may be limited to be the confidence coefficient $K_R$. In this manner, the knock determination level can be prevented from being set smaller at least than the preset confidence interval. Thus, the state where the knock does not occur can be prevented from being erroneously detected as the state where the knock occurs.

For the calculation of the corrected confidence coefficient $K_{RC}$, the higher standard deviation $VF_{SDH}[n]$ and the lower standard deviation $VF_{SDL}[n]$, which are respectively positive square roots of the higher variance $VF_{VRH}[n]$ and the lower variance $VF_{VRL}[n]$, may be used in place of the higher variance $VF_{VRH}[n]$ and the lower variance $VF_{VRL}[n]$, as expressed by the following Formula (14).

$$K_{RC} = 2 \times K_R \times VF_{SDH}[n] / (VF_{SDL}[n] + VF_{SDH}[n]) \quad (14)$$

By obtaining the corrected confidence coefficient $K_{RC}$ as expressed by the above-mentioned Formulae (12) and (14), the knock determination level can be corrected based on a degree of the distortion of the knock intensity distribution. As a result, the knock determination level can be set to an appropriate value, and hence the state where the knock occurs can be detected with high accuracy.

In this embodiment, the filtering processing is performed to allow the distribution profile to be precisely identified for the calculation of the average value, the variances, and the standard deviations, but the variances, the standard deviations, and a median may be calculated after a predetermined number of samples are stored in the memory for the purpose of further improving the accuracy of calculation of the knock determination level.

As described above, in the knock control apparatus for the internal combustion engine according to this embodiment, for setting the knock determination level by performing the statistical processing on the distribution of the knock intensity, the knock determination level is corrected according to the distortion of the distribution of the knock intensity. Therefore, the mismatching of the knock determination level due to a piece-to-piece variation of the internal combustion engine or the knock sensor can be suppressed. As a result, the accuracy of detection of the knock can be improved without close matching for the knock determination level.

What is claimed is:

1. A knock control apparatus for an internal combustion engine, comprising:

a knock sensor for detecting knock of an internal combustion engine;

a signal processing section for performing frequency analysis using discrete Fourier transform on a knock sensor signal output from the knock sensor for each cylinder and each ignition cycle to calculate a knock intensity; and a knock determination level setting section:

for calculating an average value of the knock intensity;

for calculating, based on the average value, an overall variance corresponding to a variance of the knock intensity of an entirety of a frequency distribution, a higher variance corresponding to a variance of the knock intensity above the average value, and a lower variance corresponding to a variance of the knock intensity below the average value;

for calculating a standard deviation of the knock intensity from the overall variance;

for presetting a value allowing the frequency distribution of the knock intensity to be a predetermined confidence interval as a confidence coefficient and correcting the confidence coefficient based on the higher variance and the lower variance to calculate a corrected confidence coefficient; and for setting a sum of the average value and a value obtained by multiplying the standard deviation by the corrected confidence coefficient as a knock determination level.

2. A knock control apparatus for an internal combustion engine according to claim 1, wherein the knock determination level setting section performs smoothing processing on the calculated overall variance, the calculated higher variance, and the calculated lower variance before calculating the standard deviation.

3. A knock control apparatus for an internal combustion engine according to claim 2, wherein the knock determination level setting section calculates the corrected confidence coefficient according to a formula: 2×the confidence coefficient× the higher variance/(the lower variance+the higher variance).

4. A knock control apparatus for an internal combustion engine according to claim 3, wherein the knock determination level setting section calculates the corrected confidence coefficient to allow a minimum value of the corrected confidence coefficient to be the confidence coefficient.

5. A knock control apparatus for an internal combustion engine according to claim 1, wherein the confidence coefficient is experimentally preset to allow a probability of erroneous detection of a state where the knock does not occur as a state where the knock occurs to be a predetermined value.

6. A knock control apparatus for an internal combustion engine according to claim 1, wherein the confidence coefficient is set on a map using a parameter representing at least one of an engine revolution and an engine load on an axis.

7. A knock control apparatus for an internal combustion engine, comprising:

a knock sensor for detecting knock of an internal combustion engine;

a signal processing section for performing frequency analysis using discrete Fourier transform on a knock sensor signal output from the knock sensor for each cylinder and each ignition cycle to calculate a knock intensity; and a knock determination level setting section:

for calculating an average value of the knock intensity;

for calculating, based on the average value, an overall variance corresponding to a variance of the knock intensity of an entirety of a frequency distribution, a higher variance corresponding to a variance of the knock intensity above the average value, and a lower variance corresponding to a variance of the knock intensity below the average value to calculate a higher standard deviation and a lower standard deviation based on the higher variance and the lower variance;

for calculating a standard deviation of the knock intensity from the overall variance;

for presetting a value allowing the frequency distribution of the knock intensity to be a predetermined confidence interval as a confidence coefficient and correcting the confidence coefficient based on the higher standard deviation and the lower standard deviation to calculate a corrected confidence coefficient; and for setting a sum of the average value and a value obtained by multiplying the standard deviation by the corrected confidence coefficient as a knock determination level.

8. A knock control apparatus for an internal combustion engine according to claim 7, wherein the knock determination level setting section performs smoothing processing on the calculated overall variance, the calculated higher standard deviation, and the calculated lower standard deviation before calculating the standard deviation.

9. A knock control apparatus for an internal combustion engine according to claim 8, wherein the knock determination level setting section calculates the corrected confidence coefficient according to a formula: 2×the confidence coefficient× the higher standard deviation/(the lower standard deviation+ the higher standard deviation).

10. A knock control apparatus for an internal combustion engine according to claim 9, wherein the knock determination level setting section calculates the corrected confidence coefficient to allow a minimum value of the corrected confidence coefficient to be the confidence coefficient.

11. A knock control apparatus for an internal combustion engine according to claim 7, wherein the confidence coefficient is experimentally preset to allow a probability of erroneous detection of a state where the knock does not occur as a state where the knock occurs to be a predetermined value.

12. A knock control apparatus for an internal combustion engine according to claim 7, wherein the confidence coefficient is set on a map using a parameter representing at least one of an engine revolution and an engine load on an axis.

* * * * *